(12) United States Patent
Chou et al.

(10) Patent No.: US 9,661,305 B2
(45) Date of Patent: May 23, 2017

(54) IMAGE CAPTURE DEVICE, DEPTH GENERATING DEVICE AND METHOD THEREOF

(71) Applicant: Altek Semiconductor Corporation, Hsinchu (TW)

(72) Inventors: Hong-Long Chou, Taipei (TW); Wen-Yan Chang, Miaoli County (TW); Yu-Chih Wang, Tainan (TW)

(73) Assignee: Altek Semiconductor Corporation, Hsinchu (TW)

( * ) Notice: Subject to any disclaimer, the term of this patent is extended or adjusted under 35 U.S.C. 154(b) by 330 days.

(21) Appl. No.: 14/291,190

(22) Filed: May 30, 2014

(65) Prior Publication Data

US 2015/0292873 A1    Oct. 15, 2015

(30) Foreign Application Priority Data

Apr. 15, 2014  (TW) .............................. 103113765 A (51) Int. Cl.
| | | |
|---|---|---|
| *H04N 13/02* | (2006.01) | |
| *G01B 11/255* | (2006.01) | |
| *G01B 11/25* | (2006.01) | |
| *G06T 7/521* | (2017.01) | |
| *G06T 7/593* | (2017.01) | |

(52) U.S. Cl.
CPC ......... *H04N 13/0253* (2013.01); *G01B 11/25* (2013.01); *G01B 11/254* (2013.01); *G01B 11/255* (2013.01); *G06T 7/521* (2017.01); *G06T 7/593* (2017.01); *G06T 2207/10012* (2013.01)

(58) Field of Classification Search
CPC .................................................. G06T 7/0057
See application file for complete search history.

(56) References Cited

U.S. PATENT DOCUMENTS

| 8,224,064 B1* | 7/2012 | Hasserbrook ....... G01B 11/2513 345/585 |
|---|---|---|
| 8,462,207 B2* | 6/2013 | Garcia ............... G01B 11/2513 348/135 |
| 8,493,496 B2* | 7/2013 | Freedman .............. G01B 11/25 345/32 |
| 8,494,252 B2* | 7/2013 | Freedman ............. G06T 7/0057 382/154 |
| 8,717,417 B2* | 5/2014 | Sali ..................... H04N 13/0037 348/222.1 |
| 9,098,931 B2* | 8/2015 | Shpunt .................... G06T 17/00 |
| 2003/0197806 A1* | 10/2003 | Perry ................. H04N 13/0207 348/370 |
| 2005/0018209 A1* | 1/2005 | Lemelin ................. G01B 11/25 356/604 |
| 2007/0091175 A1* | 4/2007 | Iddan .................... G01S 7/4863 348/135 |

(Continued)

*Primary Examiner* — David N Werner
(74) *Attorney, Agent, or Firm* — Jianq Chyun IP Office (57) ABSTRACT

An image capture device, a depth generating device and a method thereof are disclosed. The present disclosure is characterized in that a depth calculation technology with a structure light projection and a pictorial depth calculation technology are combined to better both of resolution and accuracy of the calculated image depth. In addition, the utilization of a modified flashlight enables the combination of the two technologies to be applied to a hand-held capture device.

9 Claims, 4 Drawing Sheets

(56) References Cited

U.S. PATENT DOCUMENTS

| | | | |
|---|---|---|---|
| 2007/0167837 A1* | 7/2007 | Moyer | A61B 5/0064 600/476 |
| 2008/0118143 A1* | 5/2008 | Gordon | G01B 11/2513 382/154 |
| 2010/0020078 A1* | 1/2010 | Shpunt | G01B 11/25 345/420 |
| 2010/0074532 A1* | 3/2010 | Gordon | G01B 11/25 382/203 |
| 2011/0025827 A1* | 2/2011 | Shpunt | G06T 7/0057 348/47 |
| 2011/0242283 A1* | 10/2011 | Tyagi | G01B 11/2545 348/46 |
| 2012/0105587 A1* | 5/2012 | Lee | G01S 7/4861 348/46 |
| 2012/0278036 A1* | 11/2012 | Da | G01B 11/25 702/167 |
| 2013/0193657 A1* | 8/2013 | Vanderberg | B62B 3/10 280/47.26 |
| 2013/0343634 A1* | 12/2013 | Xu | G06K 9/36 382/154 |
| 2014/0028800 A1* | 1/2014 | Tin | G01N 21/55 348/46 |
| 2014/0132734 A1* | 5/2014 | Zhuang | H04N 13/0253 348/47 |
| 2014/0240464 A1* | 8/2014 | Lee | G01S 17/08 348/47 |
| 2014/0320609 A1* | 10/2014 | Stettner | G01S 17/023 348/47 |
| 2014/0362261 A1* | 12/2014 | Fan | H04N 5/2256 348/242 |
| 2015/0022635 A1* | 1/2015 | Mankowski | H04N 13/0253 348/46 |
| 2015/0109414 A1* | 4/2015 | Adam | G01C 11/02 348/46 |

* cited by examiner

IMAGE CAPTURE DEVICE, DEPTH GENERATING DEVICE AND METHOD THEREOF

CROSS-REFERENCE TO RELATED APPLICATION

This application claims the benefit of Taiwan Patent Application No. 103113765, filed on Apr. 15, 2014, in the Taiwan Intellectual Property Office, the disclosure of which is incorporated herein in its entirety by reference.

BACKGROUND OF THE INVENTION

1. Field of the Invention

The present disclosure relates to a depth generating method, more particularly, to an image capture device, a depth generating device and a method thereof capable of combining two depth calculation technologies to improve precisions of the calculated depths.

2. Description of the Related Art

Common depth generating technologies can be classified into two types. The first technology is performed by a camera device cooperated with a pattern projection device. The pattern projection device projects a structure light with a preset pattern to an external environment and the camera device then captures an image from the external environment. Because the objects in the external environment are not located at the same plane, the image captured by the camera device will contain a deformed preset pattern. The depth of each object in the captured image can be calculated according to the deformation of the preset pattern in the captured image.

However, the first technology has a drawback in low resolution of generated depths due to the limitation of the structure light. At present, the amount of pixels of the camera on the hand-held device becomes higher and higher, so the drawback of low resolution limits application scope of the first technology. In addition, the first technology cannot be applied in the external environment with strong ambient light, because the structure light is not clear enough for calculating the depths.

The second technology is to capture two images with different view angles from the external environment, for example, one camera device is used to capture images at different positions, or two camera devices capture images at the same time. Next, the two images are performed image process to search corresponding feature points, and depths of each of objects in the images are calculated according to these feature points. The second technology can calculate depth of each of pixels in the image, so the resolution of calculated depths becomes higher correspondingly while the amount of pixels of the camera becomes higher. Besides, the second technology is not affected by the ambient light of the external environment.

However, the second technology has a drawback in that if the image contains single color block or repeated pattern, it is easy to cause the misjudgment in comparison of feature points between the two images, so the precisions of calculated depths are decreased correspondingly.

Therefore, what is need is a depth generating method which is not affected by the ambient light and can calculate depths with high resolution and high precisions.

SUMMARY OF THE INVENTION

To solve the above-mentioned problems, one of objectives of the present disclosure is to provide an image capture device, a depth generating device and a method thereof, to improve both of resolution and precisions of calculated depths.

Another objective of the present disclosure is to provide an image capture device, a depth generating device and a method thereof, to prevent the problem of misjudging depth while a single color block or a repeated pattern exists in the focus region.

Another objective of the present disclosure is to provide an image capture device, a depth generating device and a method thereof, to enhance precision and convenience of calculating the depths on a hand-held device by using an improved flashlight.

An exemplary embodiment of the present disclosure provides a depth generating device which comprises a pattern light projection module, a first imaging module, a second imaging module, a pattern projection based depth calculation module, a pictorial depth calculation module and a depth determination module. The pattern light projection module is configured for projecting a preset pattern to an external environment. The first imaging module is configured for respectively capturing a first image, and a third image with a deformed preset pattern from the external environment. The second imaging module is configured for respectively capturing a second image, and a fourth image with a deformed preset pattern from the external environment. The pattern projection based depth calculation module is configured for calculating a plurality of first depths, a plurality of first reliabilities, a plurality of second depths, and a plurality of second reliabilities according to deformation of the preset pattern contained in the third image and the fourth image, respectively. The pictorial depth calculation module is configured for calculating a plurality of third depths and a plurality of third reliabilities according to the first image and the second image. The depth determination module is configured for generating a plurality of fourth depths from the plurality of first depths, the plurality of second depths and the plurality of third depths, according to the plurality of first reliabilities, the plurality of second reliabilities and the plurality of third reliabilities.

Preferably, the first image or the third image comprises a plurality of pixels, and amount of the first depths or the first reliabilities is equal to amount of the pixels.

Preferably, when the imaging resolution of the second imaging module is lower than that of the first imaging module, the depth generating device further comprises an image conversion module configured for performing a resolution conversion on the image captured by the second imaging module, so that the amount of the pixels of the second image is equal to that of the first image.

Preferably, the depth determination module further respectively removes the depths with low reliabilities from the first depths, the second depths and the third depths according to the first reliabilities, the second reliabilities and the third reliabilities, and the depth determination module generates the fourth depths according to the first depths, the second depths and the third depths not being removed.

Preferably, the pattern light projection module comprises a flashlight and a transparent pattern mask. The transparent pattern mask has the preset pattern and disposed on a light emitting direction of the flashlight. The preset pattern comprises lines, curves, colorful blocks or combination thereof.

An exemplary embodiment of the present disclosure provides a depth generating method which comprises following steps. First, a pattern light projection module is used to project a preset pattern to an external environment. Next, a first imaging module is used to respectively capture a first image, and a third image with a deformed preset pattern from the external environment. A second imaging module is used to respectively capture a second image, and a fourth image with a deformed preset pattern from the external environment. A plurality of first depths and a plurality of first reliabilities are calculated according to deformation of the preset pattern in the third image. Next, a plurality of second depths and a plurality of second reliabilities are calculated according to deformation of the preset pattern in the fourth image. A pictorial depth calculating process is executed on the first image and the second image, to obtain a plurality of third depths and a plurality of third reliabilities. Finally, a plurality of fourth depths are generated from the plurality of first depths, the plurality of second depths and the plurality of third depths, according to the plurality of first reliabilities, the plurality of second reliabilities and the plurality of third reliabilities.

Preferably, the preset pattern comprises lines, curves, colorful blocks, or combination thereof.

Preferably, the first image or the third image comprises a plurality of pixels, and amount of the first depths or the first reliabilities is equal to amount of the pixels.

Preferably, when an imaging resolution of the second imaging module is lower than that of the first imaging module, before the step of calculating depths, the depth generating method further comprises a step of performing a resolution conversion on the image captured by the second imaging module so that the amount of pixels of the second image is equal to that of the first image.

An exemplary embodiment of the present disclosure provides an image capture device which comprises a pattern light projection module, a first imaging module, a second imaging module, a pattern projection based depth calculation module, a pictorial depth calculation module, a depth determination module and a storage module. The pattern light projection module is configured for projecting a preset pattern to an external environment. The first imaging module is configured for respectively capturing a first image, and a third image with a deformed preset pattern from the external environment. The second imaging module is configured for respectively capturing a second image, and a fourth image with a deformed preset pattern from the external environment. The pattern projection based depth calculation module is configured for calculating a plurality of first depths, a plurality of first reliabilities, a plurality of second depths, and a plurality of second reliabilities according to deformation of the preset pattern contained in the third image and the fourth image, respectively. The pictorial depth calculation module is configured for calculating a plurality of third depths and a plurality of third reliabilities according to the first image and the second image. The depth determination module is configured for generating a plurality of fourth depths from the plurality of first depths, the plurality of second depths and the plurality of third depths, according to the plurality of first reliabilities, the plurality of second reliabilities and the plurality of third reliabilities. The storage module is configured for storing the first image as an output image, and storing the plurality of fourth depths as depths of the output image.

Preferably, the pattern light projection module comprises a flashlight and a transparent pattern mask. The transparent pattern mask is disposed on a light emitting direction of the flashlight.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 1:
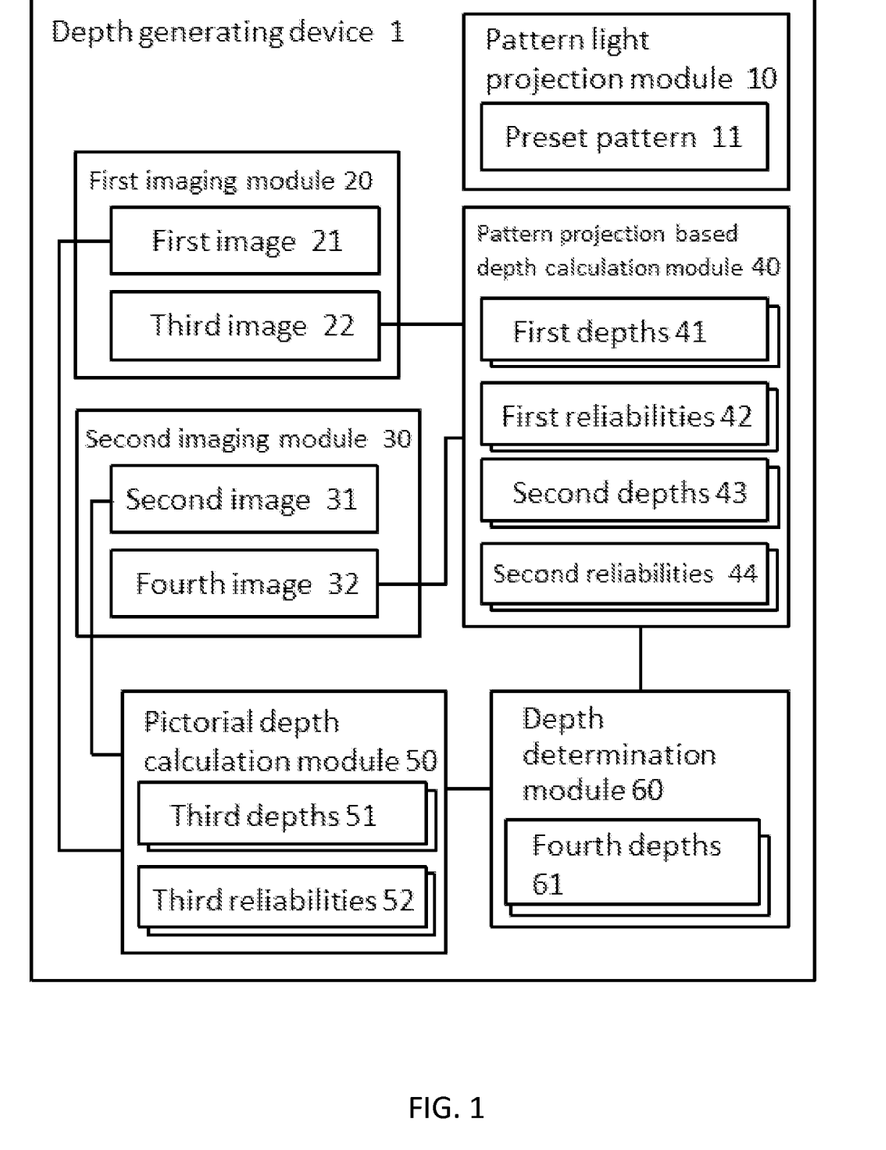
FIG. 1 is a block diagram of a depth generating device according to the present disclosure.

Please refer to FIG. 1 which is a block diagram of a depth generating device according to the present disclosure. In FIG. 1, a depth generating device 1 comprises a pattern light projection module 10, a first imaging module 20 a second imaging module 30, a pattern projection based depth calculation module 40, a pictorial depth calculation module 50 and a depth determination module 60.

The pattern light projection module 10 projects a structure light with a preset pattern 11 to an external environment. In implementation, the pattern light projection module 10 comprises a flashlight and a transparent pattern mask. Transparent pattern mask has the preset pattern 11 and is disposed on a light emitting direction of the flashlight 12. The preset pattern 11 comprises lines, curves, colorful blocks, or combination thereof.

In addition, if the flashlight has two light sources, the transparent pattern mask can be disposed to just cover one of the light sources, so the flashlight can selectively project the structure light with the preset pattern 11 or a light without the preset pattern 11.

After the pattern light projection module 10 projects the structure light, the first imaging module 20 and the second imaging module 30 respectively capture a third image 22 and a fourth image 32 which have deformed preset pattern 11. Objects in the external environment do not locate at the same plane, or outlines of the objects are not on the same plane, so the structure light with the preset pattern 11 projected on these objects becomes deformed, and be imaged in the third image 22 and the fourth image 32.

After the third image 22 and the fourth image 32 are captured, the first imaging module 20 and the second imaging module 30 capture a first image 21 and a second image 31, respectively. Preferably, the first image 21 and the second image 31 do not contain the deformed preset pattern 11, but the present disclosure is not limited. The subsequent processes are not affected if the first image 21 and the second image 31 contain the deformed preset pattern 11, and this situation is included within the spirit and scope of the appended claims.

The pattern projection based depth calculation module calculates a plurality of first depths 41, a plurality of first reliabilities 42, a plurality of second depths 43, and a plurality of second reliabilities 44 according to deformation of the preset pattern 11 contained in the third image 22 and the fourth image 32, respectively.

The pictorial depth calculation module 50 calculates a plurality of third depths 51 and a plurality of third reliabilities 52 according to the first image 21 and the second image 31.

Figure 2:
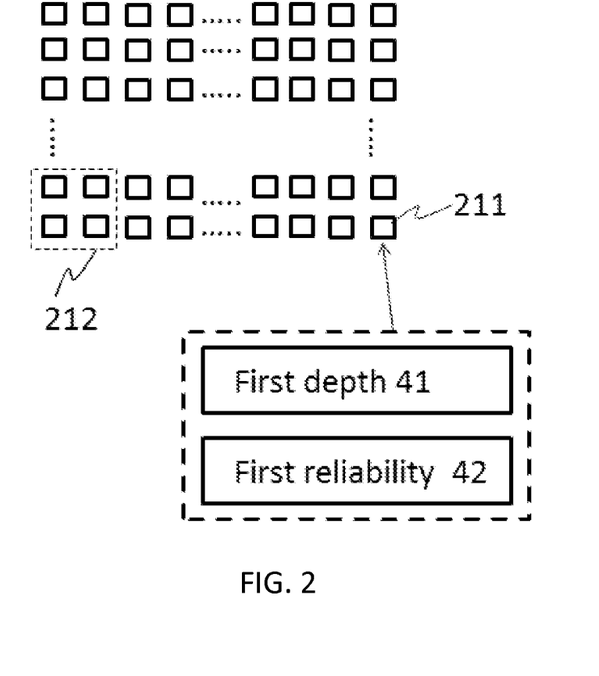
FIG. 2 is a schematic view of relationship between depths, reliabilities and image regions according to the present disclosure.

In this exemplary embodiment, each of the first image 21 and the third image 22 comprises a plurality of pixels 211 as shown in FIG. 2. Preferably, the amount of the first depths 41 and the first reliabilities 42 are equal to amount of pixels 211 of the first image 21, that is, each of pixels 211 corresponds to one of the first depths 41 and one of the first reliabilities 42 correspondingly, however, the present disclosure is not limited thereto. For example, pixels 211 of the first image 2 can be divided into a plurality of pixel groups, for example, in FIG. 2 a pixel group 212 includes four pixels 211, and each pixel group 212 has a corresponding first depth 41 and a first reliability 42. Therefore, the required computing power can be decreased, but resolution of the first depths 41 and the first reliabilities 42 are also decreased to one-quarter of the resolution of the first image 21.

Amount of the pixels of the first imaging module 20 can be larger than or equal to that of the second imaging module 30. In consideration of cost, the second imaging module 30 may function as an auxiliary camera, so its imaging resolution may be lower than that of the first imaging module 20 which functions as a main camera.

In this case, the depth generating device 1 can further comprise an image conversion module which performs a resolution conversion on the image captured by the second imaging module 30, so that amount of pixels of the second image 31 is equal to that of the first image 21 for facilitating the subsequent calculation. Preferably, the resolution conversion may be an interpolation process. The technology related to resolution conversion is well known by the skilled person in this technology field, so the detail description is omitted.

The depth determination module 60 generates a plurality of fourth depths 61 from the plurality of first depths 41, the plurality of second depths 43 and the plurality of third depths 51, according to the plurality of first reliabilities 42, the plurality of second reliabilities 44 and the plurality of third reliabilities 52.

For example, firstly the depth determination module 60 removes the depths of which reliabilities 42 are lower than a threshold, from the plurality of first depths 41, the plurality of second depths 43 and the plurality of third depths 51 according to the plurality of first reliabilities 42, the plurality of second reliabilities 44 and the plurality of third reliabilities 52, respectively. Next, the depth determination module 60 generates the plurality of fourth depths 61 according to the plurality of first depths 41, the plurality of second depths 43 and the plurality of third depths 51 which are not removed.

Therefore, if a single color block or a repeated pattern appears in the first image 21 and the second image 31, the third reliabilities 52 corresponding to the third depths 51 calculated from this region by the pictorial depth calculation module 50 can be too low, so error may occurs if such third depth 51 is applied in sequential process. On the other hand, the pattern projection based depth calculation module 40 is not easy to be affected by the single color block or repeated pattern, so the first reliability 42 of the first depth 41 or the second reliability 44 of the second depth 43 for such region is higher.

Therefore, after removing the third depths 51 for such region, the depth determination module 60 can refer to the first reliability 42 or the second reliability 44 for such region to determine the fourth depths 61 for such region. For example, the depth determination module 60 can select the first depth 41 or the second depth 43 of which the first reliability 42 or the second reliability 44 is larger, as the fourth depth 61 for such region.

Alternatively, if the first reliability 42 or the second reliability 44 are high value and close each other, the depth determination module 60 can use the average value of the first depth 41 and the second depth 43 as the fourth depth 61 for the region.

On the other hand, when the ambient light of the external environment is too strong, the projected structure light in the third image 22 and the fourth image 32 becomes non-obvious, and it causes the first reliability 42 and the second reliability 44 too low. In this case, the depth determination module 60 can select the plurality of third depths 51 as the plurality of fourth depths 61.

Therefore, the depth generating device according to the present disclosure can improve both of resolution and precision of the depths.

Figure 3:
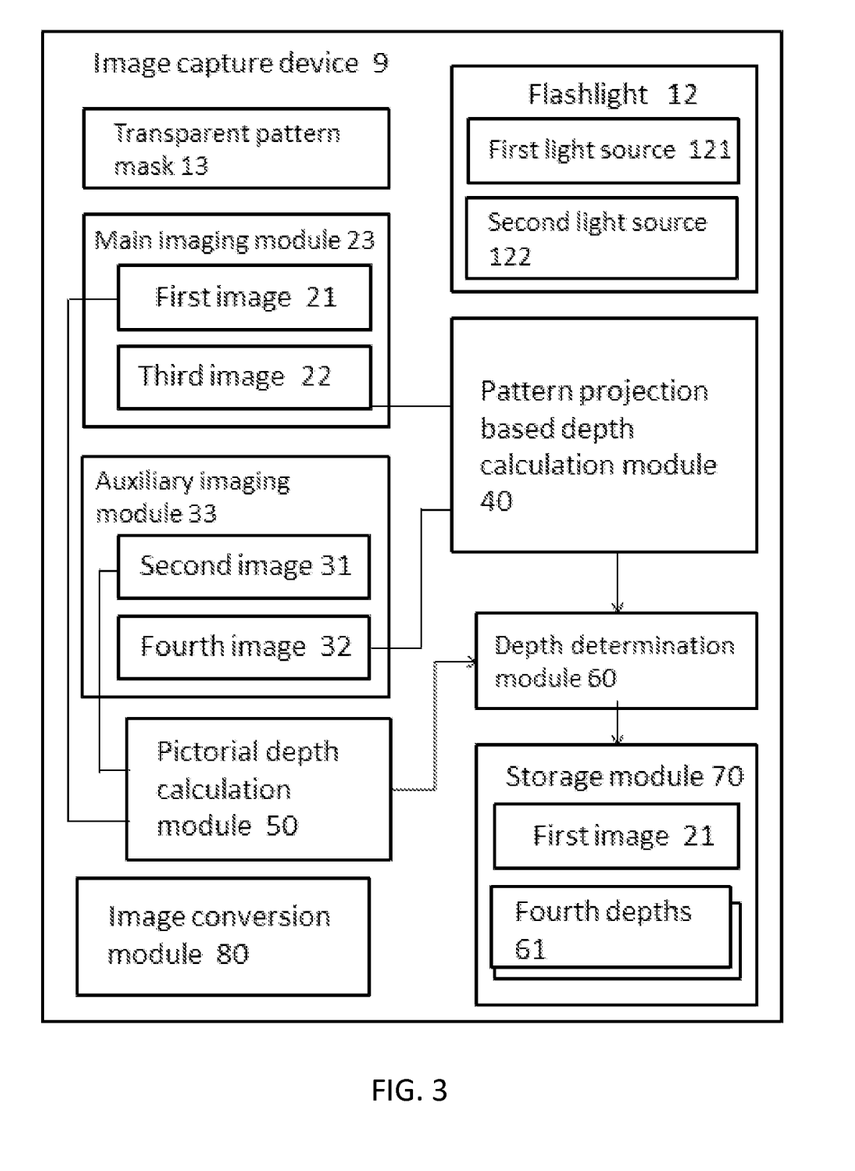
FIG. 3 is a block diagram of an image capture device according to the present disclosure.

Please refer to FIG. 3 which is a block diagram of an image capture device according to the present disclosure. In FIG. 3, the image capture device 9 comprises a flashlight 12, a transparent pattern mask 13, a main imaging module 23, an auxiliary imaging module 33, a pattern projection based depth calculation module 40, a pictorial depth calculation module 50, a depth determination module 60, a storage module 70 and an image conversion module 80. The imaging resolution of the main imaging module 23 is higher than that of the auxiliary imaging module 33, and the main imaging module 23 and the auxiliary imaging module 33 are disposed at different positions on the image capture device 9.

The flashlight 12 comprises a first light source 121 and a second light source 122 for emitting light respectively. The transparent pattern mask 13 is disposed on a light emitting direction of the second light source 122. Therefore, when the second light source 122 emits light, the image capture device 9 can project a structure light with the preset pattern 11 to an external environment. The image capture device 9 can just drive the first light source 121 to emit light for shooting a common picture. When the depths of the captured image are required, the image capture device 9 can drive the second light source 122 to emit light first, and then control the main imaging module 23 and the auxiliary imaging module 33 to capture the first image 21 and the second image 31, respectively. Later, the first light source 121 is driven to emit light for shooting a common picture.

The main imaging module 23 respectively captures a first image 21 and a third image 22 with a deformed preset pattern 11 from the external environment. The auxiliary imaging module 33 respectively captures a second image 31 and a fourth image 32 with a deformed preset pattern 11 from the external environment.

The image conversion module 80 performs an interpolation process to increase the resolution of the image captured by the auxiliary imaging module 33, so that the consistency between the images captured by the auxiliary imaging module 33 and the main imaging module 23 can be improved, so as to facilitate the subsequent calculation performed in the pattern projection based depth calculation module 40 and the pictorial depth calculation module 50.

The operation or the principle of the pattern projection based depth calculation module 40, the pictorial depth calculation module 50 and the depth determination module 60 are similar to the above-mentioned content, so their detail description are omitted.

Finally, the storage module 70 stores the first image 21 as an output image 71, and stores a plurality of fourth depths 61 as depths of the output image 71 for subsequent image application.

Figure 4:
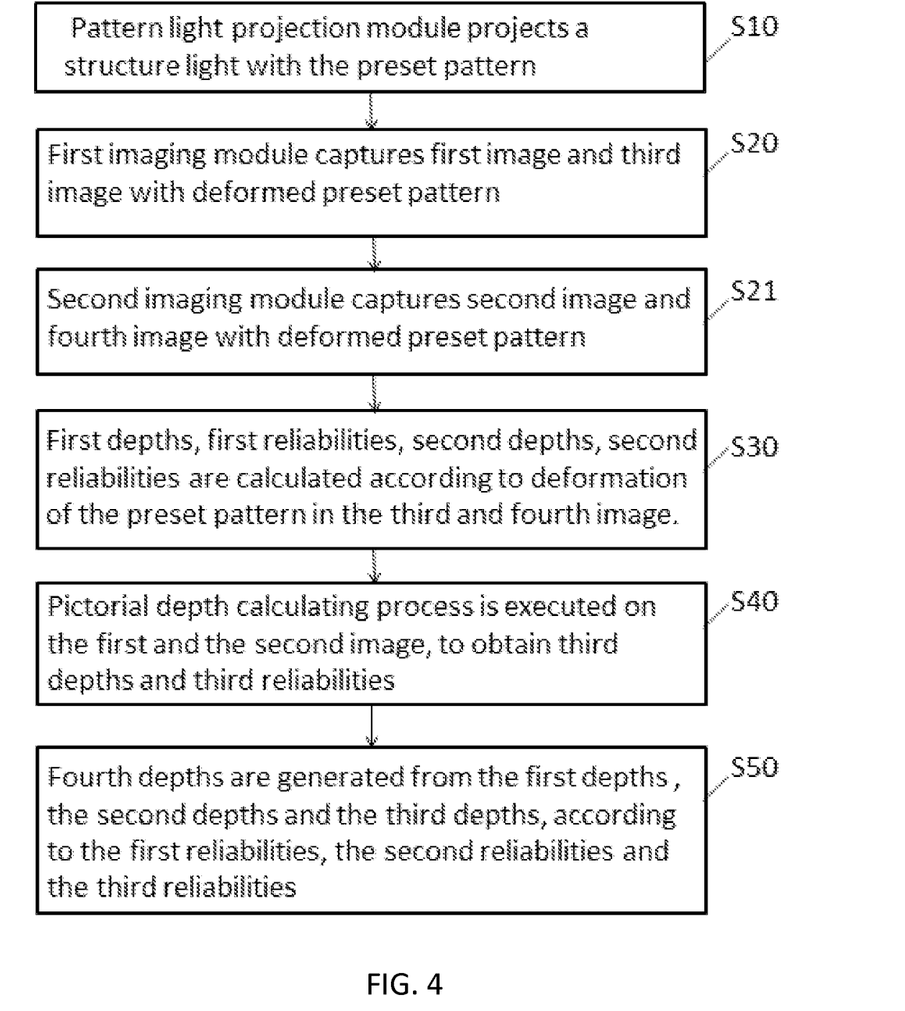
FIG. 4 is a flow diagram of a depth generating method according to the present disclosure.

Please refer to FIG. 4 which is a flow diagram of a depth generating method according to the present disclosure. In FIG. 4, the depth generating method is illustrated cooperatively with the depth generating device 1 of the FIG. 1, and comprises following steps. In step S10, a pattern light projection module 10 is used to project a structure light with the preset pattern 11 to an external environment.

In step S20, a first imaging module 20 is used to respectively capture a first image 21 and a third image 22 with a deformed preset pattern 11 from the external environment.

In step S21, a second imaging module 30 is used to respectively capture a second image 31 and a fourth image 32 with a deformed preset pattern 11 from the external environment.

In step S30, a plurality of first depths 41 and a plurality of first reliabilities 42 are calculated according to deformation of the preset pattern 11 in the third image 22, respectively. A plurality of second depths 43 and a plurality of second reliabilities 44 according to deformation of the preset pattern 11 in the fourth image 32.

In step S40, a pictorial depth calculating process is executed on the first image 21 and the second image 31, to obtain a plurality of third depths 51 and a plurality of third reliabilities 52.

Preferably, the first image 21 or the third image 21 comprises a plurality of pixels, and amount of the plurality of first depths 41 or the plurality of first reliabilities 42 is equal to amount of the plurality of pixels. Moreover, when an imaging resolution of the second imaging module 30 is lower than that of the first imaging module 20, before the step of calculating depths, the depth generating method further comprises a step of performing a resolution conversion on the image captured by the second imaging module 30 so that the amount of pixels of the second image is equal to 31 that of the first image 21.

Finally, in step S50, a plurality of fourth depths 61 are generated from the plurality of first depths 41, the plurality of second depths 43 and the plurality of third depths 51, according to the plurality of first reliabilities 42, the plurality of second reliabilities 44 and the plurality of third reliabilities 52.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A depth generating device, comprising:
    a pattern light projector, configured for projecting a preset pattern to an external environment;
    a first camera, configured for respectively capturing a first image and a third image with the deformed preset pattern from the external environment;
    a second camera, configured for respectively capturing a second image and a fourth image with the deformed preset pattern from the external environment;
    a processor, configured for:
        calculating a plurality of first depths and a plurality of second depths according to deformed degree of the preset pattern contained in the third image and the fourth image, respectively;
        calculating a plurality of third depths according to the first image and the second image; and
        generating a plurality of fourth depths from the plurality of first depths, the plurality of second depths and the plurality of third depths, wherein:
            when there exists a single color block or a repeated pattern, the processor generates the fourth depths according to the first depths or the second depths; and
            when an ambient light is too strong, the processor generates the fourth depths according to only the third depths.

2. The depth generating device according to claim 1, wherein the first image or the third image comprises a plurality of pixels, and the amount of the plurality of first depths of the first image is equal to the amount of the plurality of pixels.

3. The depth generating device according to claim 2, wherein when an imaging resolution of the second camera is lower than that of the first camera, the processor is further configured for performing a resolution conversion on the image captured by the second camera, so that the amount of the pixels in the second image is equal to that of the first image.

4. The depth generating device according to claim 1, wherein the pattern light projector comprises a flashlight and a transparent pattern mask, and the transparent pattern mask has the preset pattern and is disposed on a light emitting direction of the flashlight, and the preset pattern comprises lines, curves, colorful blocks or combination thereof.

5. A depth generating method, comprising:
    using a pattern light projector to project a preset pattern to an external environment, wherein the preset pattern comprises lines, curves, colorful blocks, or combination thereof;
    using a first camera to respectively capture a first image and a third image with the deformed preset pattern from the external environment;
    using a second camera to respectively capture a second image and a fourth image with the deformed preset pattern from the external environment;
    calculating a plurality of first depths according to deformation of the preset pattern in the third image;
    calculating a plurality of second depths according to deformation of the preset pattern in the fourth image;

calculating a plurality of third depths according to the first image and the second image; and generating a plurality of fourth depths from the plurality of first depths, the plurality of second depths and the plurality of third depths, wherein:

when there exists a single color block or a repeated pattern, the processor generates the fourth depths according to the first depths or the second depths; and when an ambient light is too strong, the processor generates the fourth depths according to only the third depths.

6. The depth generating method according to claim 5, wherein the first image or the third image comprises a plurality of pixels, and the amount of the plurality of first depths of the first image is equal to the amount of the plurality of pixels.

7. The depth generating method according to claim 5, wherein when an imaging resolution of the second camera is lower than that of the first camera, the depth generating method comprises a step before the step of calculating the depths:

performing a resolution conversion on the image captured by the second camera, to let the amount of pixels of the second image be equal to that of the first image.

8. An image capture device, comprising:

a pattern light projector, configured for projecting a preset pattern to an external environment;

a first imaging camera, configured for respectively capturing a first image and a third image with the deformed preset pattern from the external environment;

a second camera, configured for respectively capturing a second image and a fourth image with the deformed preset pattern from the external environment;

a processor, configured for:

calculating a plurality of first depths and a plurality of second depths according to deformed degree of the preset pattern contained in the third image and the fourth image, respectively;

calculating a plurality of third depths and a plurality of third reliabilities according to the first image and the second image;

generating a plurality of fourth depths from the plurality of first depths, the plurality of second depths and the plurality of third depths, wherein:

when there exists a single color block or a repeated pattern, the processor generates the fourth depths according to the first depths or the second depths; and when an ambient light is too strong, the processor generates the fourth depths according to only the third depths; and a memory, configured for storing the first image as an output image, and storing the plurality of fourth depths as depths of the output image.

9. The image capture device according to claim 8, wherein the pattern light projector comprises a flashlight and a transparent pattern mask, and the transparent pattern mask is disposed on a light emitting direction of the flashlight.

* * * * *